United States Patent [19]

King et al.

[11] 4,145,674
[45] Mar. 20, 1979

[54] ELECTROMAGNETIC INTERFERENCE SUPPRESSION SYSTEM FOR ELECTRICAL EQUIPMENT

[76] Inventors: William M. King, 510 17th St., Santa Monica, Calif. 90402; Jack V. Roberts, 6005 Corning Ave., Los Angeles, Calif. 90056

[21] Appl. No.: 797,466

[22] Filed: May 16, 1977

Related U.S. Application Data

[63] Continuation of Ser. No. 573,136, Apr. 30, 1975, abandoned.

[51] Int. Cl.² .......................... H03H 7/02; H02J 1/02; H04B 3/28
[52] U.S. Cl. .................................... 333/181; 307/105; 333/12; 333/185
[58] Field of Search ...................... 333/70 R, 76, 70 S, 333/12, 79; 310/50, 51, 71, 72; 307/105

[56] References Cited

U.S. PATENT DOCUMENTS

| | | |
|---|---|---|
| 2,015,667 | 10/1935 | Fleming et al. ................. 307/105 X |
| 2,165,886 | 7/1939 | Daniel ................................. 307/105 |
| 2,321,376 | 6/1943 | Finch ..................................... 333/76 |
| 2,419,907 | 4/1947 | Mole .................................. 333/12 X |
| 2,705,759 | 4/1955 | Taggart ............................... 307/105 |
| 3,373,301 | 3/1968 | Black ............................. 307/105 X |
| 3,548,347 | 12/1970 | Miller et al. ....................... 333/70 R |
| 3,555,466 | 1/1971 | Bernstein ............................ 333/76 |
| 3,854,107 | 12/1974 | Tuchto et al. ........................ 333/79 |

*Primary Examiner*—Alfred E. Smith
*Assistant Examiner*—Marvin Nussbaum

[57] ABSTRACT

Method and apparatus for suppressing differential and common mode conducted electromagnetic interference emission in electrical equipment powered from a grounded A.C. line source without creation of a shock hazard. Differential mode interference is suppressed by connecting a capacitor across the power lines and common mode interference is suppressed by an inductor inserted in the ground lead, both positioned within the equipment case or housing. The capacitor and inductor can have substantially fixed values for a wide range of equipment. In the preferred embodiment, the inductor is constructed by winding a few turns of the ground lead itself through a high permeability, ferrite toroid positioned within the case or housing.

6 Claims, 4 Drawing Figures

ELECTROMAGNETIC INTERFERENCE SUPPRESSION SYSTEM FOR ELECTRICAL EQUIPMENT

This is a continuation of application Ser. No. 573,136, filed Apr. 30, 1975, now abandoned.

BACKGROUND OF THE INVENTION

1. Field of the Invention

This invention relates to electromagnetic interference emission suppression systems and, more particularly, to such a system especially adapted for economically and safely suppressing such interference in relatively small, portable electrical equipment such as portable hand tools and the like.

2. Description of the Prior Art

Portable electrical equipment, typically electric drills, electric mixers, hand held saws and the like generate electromagnetic interference emission during the course of their operation, principally due to commutation of the electric motors used in such equipment and, also, because of generally periodic electrical transients generated by the type of motor speed controls employed. The interference may be both radiated from the equipment itself and also conducted back through the A.C. power line to other equipment with the power lines serving to further radiate the interference. It is the conducted interference which appears to be most objectionable and which is the subject of suppression regulations for some applications in various areas of the world including the United States.

Conducted electromagnetic interference is generally considered to be generated in two distinct propagation modes. Differential mode electromagnetic interference is generated largely by motor commutation current impulses or motor control transients and is propogated on the A.C. power leads between the motor and the impedance of the power source due to phase and voltage differences between the leads. Common mode interference, on the other hand, is generated between both A.C. power leads acting together with a common phase and the ground lead. Common mode electromagnetic interference problems are most significant in a frequency range between approximately 1 MHz and 30 MHz in which the interference frequencies are, low enough to be conducted in-phase through the two power leads toward the impedance of the power source and returned through the ground lead to the case or housing of the equipment, and high enough to be capacitively and inductively coupled from the source of its interference back to the case which is connected to the ground lead. The electrical circuit for the interference is thereby completed, allowing transmission of the interference through the power lines.

Various suppression systems are known in the prior art for connection to the power terminals of electrical equipment to suppress conduction of electromagnetic interference through the power leads that supply the equipment. However, most of these systems are deficient due to introducing a shock hazard by connecting active power leads to the equipment case through the suppression elements, or are complex and require mounting space which normally is available only in or around relatively large, stationary equipment, or both.

Of course, creation of the aforementioned shock hazard is undesirable in either stationary or portable electric equipment. Unlike stationary equipment, though, portable electric equipment is continually being connected and disconnected by the user from its source of power. It is believed that this situation is more likely to result in a defective ground connection to the equipment case and, therefore, a greater likelihood of shock hazard. To some extent, the equipment user determines whether a defective ground connection is created, for instance, in the case of single-phase equipment that employs a three-prong power plug and where only a two-prong power outlet is available. Under these circumstances, it is not uncommon for the equipment user to frustrate the special three-prong safety feature and operate the equipment by leaving the case ungrounded.

In addition, special problems exist with regard to portable electric equipment in terms of space and cost considerations. Ideally, incorporation of an electromagnetic suppression system into portable electric equipment should not detract from its portability or ease of use. Yet, stringent space limitations are inherent in portable electric equipment, and render infeasible the use of bulky filter elements or systems. This problem can be especially severe when the original manufacturer of the equipment, apparently, did not consider that the equipment ultimately would have to be equipped with a suppression system to satisfy particular governmental suppression regulations. Also, the cost of a complex filtering system can become a prohibitive factor when equipping relatively inexpensive portable equipment.

Differential mode conducted interference is conventionally suppressed by connecting a capacitor of approximately 0.047 to 0.22 mfd between the A.C. power leads. Differential mode interference is conducted between the two power leads by the capacitor and effectively shorted out or by-passed between the leads preventing flow down the lines. The actual value of capacitance value needed is typically empirically determined for each type of equipment and the suppression standard to be met.

One prior art technique for suppressing common mode interference is connecting a capacitor between each of the two A.C. power leads and the ground lead to short out or by-pass the interference. Again, the required capacitance values vary over a wide range (0.001–0.047 mfd) and are empirically determined by the type of equipment, suppression standard to be met and the value of the differential mode suppression capacitor. Thus, with this suppression technique, the differential and common mode suppression capacitors must usually be experimentally determined for each type of equipment for optimum results and many different capacitor values are needed when providing suppression components for a number of different types of equipment.

These capacitors provide a relatively low radio frequency impedance but a relatively high power frequency impedance path for current between the power lines and the equipment case. However, if the ground connection is partly or wholly defective the case becomes electrically energized and an equipment user experiences a low energy shock. Though not dangerous, the shock is continuous and uncomfortable and it is common for the user to respond by removing the interference suppression capacitors. The suppression of electromagnetic interference is thus defeated. An even more serious problem arises from a possible failure of one of the common mode suppression capacitors by shorting. The appliance is then effectively connected to the A.C. power leads and, if the ground connection should be defective, an equipment user may experience a very serious, and occasionally fatal, shock upon contact with the case and any adjacent, substantially grounded object.

Another, and safer, prior art technique for suppressing common mode interference is to insert an inductance in the common mode transmission circuit to effectively block conduction of the interference signals. There is then no possible connection between the power lines and the case of a piece of equipment, eliminating the shock hazard described above. However, due to the much higher cost and space requirements of inductors, as compared to capacitors, this suppression technique has heretofore been used only for relatively sophisticated and costly equipment typically designed for interconnection with other such equipment and has utilized specialized components such as a dual winding inductors for common insertion in both power line leads to avoid placing inductive impedances in ground wires creating ground loops between interconnected pieces of equipment.

Thus, from the foregoing, it can be seen that there has long been a need for a technique for the suppression of electromagnetic interference in small, portable electric equipment which would not pose a shock hazard and yet is compact and inexpensive for incorporation in such equipment. The present invention satisfies that need.

SUMMARY OF THE INVENTION

The present invention provides an electromagnetic interference suppression system, particularly for small, portable electric equipment and the like equipment, which is both safe from shock hazard and is economical in its use. The suppression system includes a differential mode suppression capacitor connected across the power line leads within the case or housing of the equipment with the capacitor having only one, or very few, capacitance values for a wide range of types of equipment. The system also includes a common mode suppression inductor in the ground lead of the equipment, preferably also within the case of the equipment. Only one inductance value is typically required for a wide range of equipment so that a single set of capacitance and inductance values may serve a great number of different types of electrical equipment.

In the presently preferred embodiment, the inductor may be economically fabricated by winding a relatively few turns of an existing ground lead around or through a high relative permeability magnetic material, such as a ferrite toroid. Thus, a separate inductor and its mounting are not needed. Additionally, a relatively few turns through a toroid greatly reduces interference transmission through the parasitic capacitance Thus, the electromagnetic interference suppression system of the present invention may be incorporated into electrical equipment economically and without shock hazard. These and other features of the invention will become apparent from the following detailed description.

DESCRIPTION OF THE PREFERRED EMBODIMENT

Figure 1:
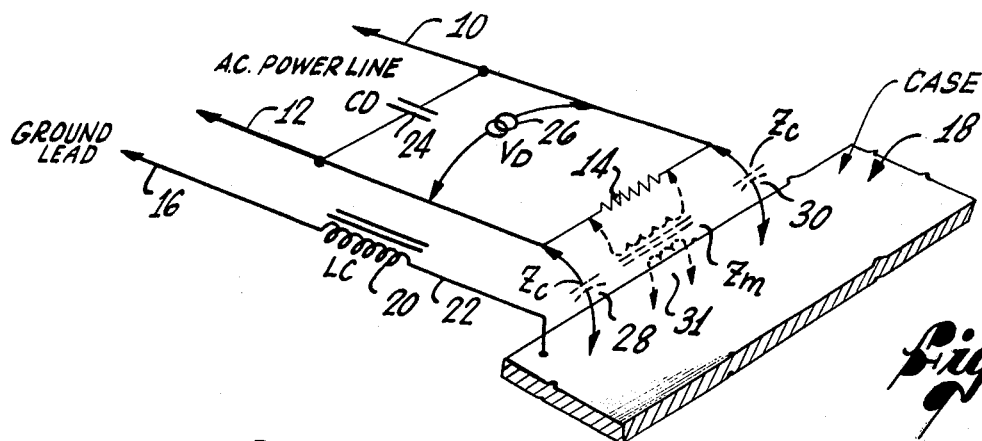
FIG. 1 is an electrical diagrammatic view of the power line circuitry illustrating the differential and common mode interference sources and the suppression system of the present invention.

Turning now to the drawings, particularly FIG. 1 thereof, the electric circuit of a piece of electrical equipment is diagramatically illustrated as being powered from a pair of A.C. Power lines 10, 12 connected across a representative load $R_L$ (14). The power lines 10, 12 include a ground lead 16 which is conventionally connected to a case 18 of the equipment. However, in the presently preferred embodiment of the suppression system of the invention, the ground lead 16 is first connected through an inductor $L_C$ (20) and then through a line 22 to the case 18. In addition, the suppression system includes a capacitor $C_D$ (24) connected across the power lines 10, 12 as close to the load $R_L$ (14) as possible.

In its operation the electrical equipment produces differential and common mode electromagnetic interference. The differential mode interference appears across the power lines 10, 12 and is represented in FIG. 1 is a generalized, high frequency voltage source $V_D$ (26) across the lines. The common mode interference generally appears between each power line 10, 12 and the case 18 of the equipment and is represented in FIG. 1 by a pair of generalized capacitive impedances $Z_c$ (28, 30) between the lines and the case. Additionally, the interference may be inductively coupled to the case 18 through a generalized inductive impedance $Z_m$ (31). From the case 18, the differential mode voltage source $V_C$ (28), and common voltages across the generalized impedances $Z_c$ (28, 30) and inductive impedance $Z_m$ (31) are effectively connected to the line 22.

With the differential mode interference suppression capacitor $C_D$ (24) in place across the power lines 10, 12, a relatively low capacitive impedance at the frequencies involved, the differential mode interference voltage source $V_D$ (26) is effectively shorted out or by-passed preventing the interference from propagating down the power lines. Similarly, with the common mode interference suppression inductance $L_C$ (20) in place in the ground lead 16, the high inductive impedance at the interference frequencies involved creates an substantially open circuit for the common mode interference through the capacitive and inductive impedances $Z_c$ (28, 30) and $Z_m$ (31), respectively, preventing propagation of the common mode interference between either of the power lines 10, 12 and the ground lead 16.

It should be appreciated from a consideration of FIG. 1 that there is, as a practical matter, no impedance path, capacitive or otherwise between either of the power lines 10, 12 and the ground lead for the usual power line frequency of 60 Hz. Thus, there is no possibility of a shock hazard due to the suppression components themselves. The differential mode voltage source $V_D$ (26) and the voltages across the capacitive and inductance impedances $Z_c$ (28, 30) and $Z_m$ (31), respectively, are of low potential and relatively high frequency (1–30 MHz) and pose no shock hazard themselves, only an interference problem.

The values of the differential mode suppression capacitor $C_D$ (24) is empirically selected in accordance with the type of equipment and the suppression standard to be met but it has been found that one value will serve a number of different models of the same general type of equipment. For example, one capacitor value may be utilized in a number of different sized electric drills of the same general mechanical and electrical configuration. Thus empirical testing need only be performed once and only one value of capacitor need be stocked in order to suppress as desired any of a number of different models of the tested type of equipment. This results in the saving of a great deal of testing time and eliminates the need for stocking a large number of component values, resulting in a cost saving. Similarly, it has been found that common mode interference suppression with the suppression inductor $L_C$ (20) may be accomplished with a single value inductance for a number of different models of the same type of equipment, again as an example, different sizes of electric drill. An inductor having the required inductance value may then be designed to fit within the case of a wide variety of similar types of equipment.

Figure 2:
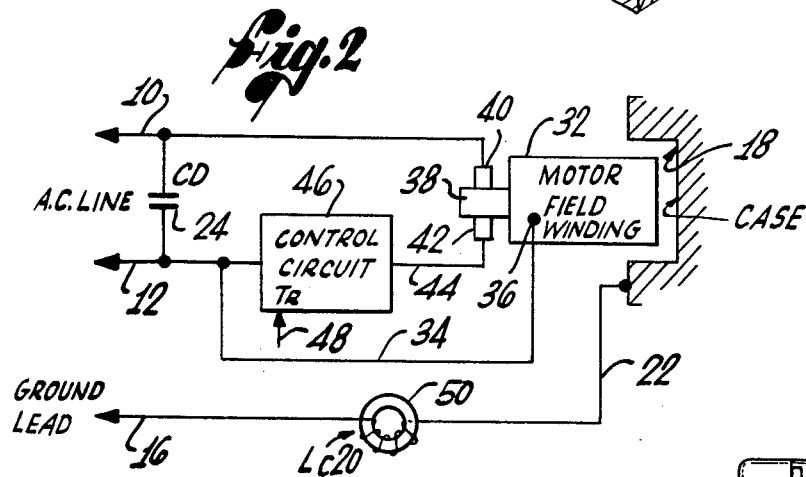
FIG. 2 is a combined electrical schematic and diagrammatic illustration of a presently preferred embodiment of the invention installed in an electric drill such as that shown in FIG. 3.

FIG. 2 is a diagrammatic representation of a particular type of equipment in which the presently preferred embodiment of the invention is utilized. The piece of equipment is a portable electric drill (FIG. 3) including a motor 32 conventionally mounted in a case 18. The motor 32 has a conventional field winding supplied with current from one of the power lines 12 through a connecting line 34 to a field winding terminal 36. The motor 32 also has a conventional armature 38 supplied with power through a pair of brushes 40 and 42. The brush 40 is connected directly to the power line 10 but the brush 42 is supplied by a controlled power line 44 which is the output of a conventional speed control circuit 46. The operation of the speed control circuit 46 is diagrammatically represented by a trigger control input 48.

For the configuration of the electric drill, the differential mode interference suppression capacitor $C_D$ (24) is connected across the power lines 10, 12 between the lines and the control circuit 46 in order to suppress differential mode interference generated both by the commutation and the armature 38 of the motor 32 and the interference generated by the operation of the control circuit 46.

The common mode interference suppression inductor $L_C$ (20) is connected in the ground lead 16 which is connected to the case 18 of the drill through the line 22. In the presently preferred embodiment of the invention, the suppression inductor $L_C$ (20) is provided by a few turns of wire around or through a toroid 50 or other physical configuration of a high relative permeability. While a separate inductor, may be used, it has been found that the needed inductance values may be provided by constructing the inductor by winding the ground lead 16 itself through the toroid 50 before attaching it to the case 18 of the drill. The physical size of the toroid 50 required and the number of turns typically required to create the correct inductance are such that the constructed inductor will normally fit within the confines of the open spaces of the case 18 of the drill. Since the insulation on the ground lead 16 remains in place, no further special insulation is required nor are mounting brackets for the inductor $L_C$ (20) needed. Thus, the required common interference suppression inductor $L_C$ (20) may be economically constructed and installed.

Figure 3:
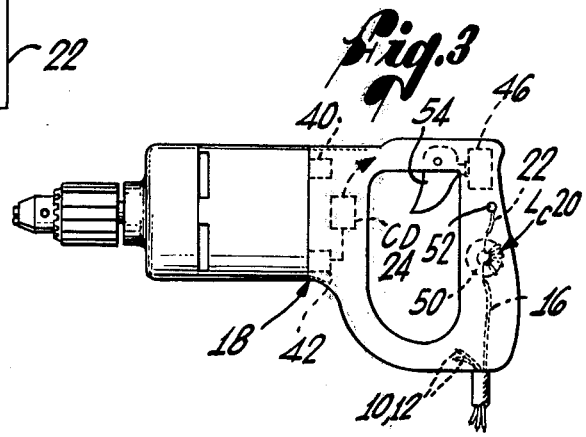
FIG. 3 is a partially phantomed view of an electric drill with the components of a presently preferred embodiment of the invention shown installed.

FIG. 3 illustrates the placing of the differential modes of interference suppression capacitor 24 and the common mode interference suppression inductor $L_C$ (20) within the case 18 of the drill. The suppression capacitor $C_D$ (24) is normally of relatively small size and may be positioned within the drill within the vicinity of the brushes 40, 42. The capacitor $C_D$ (24) is shown in phantom and without associated connecting circuitry for clarity. The power lines 10, 12 are illustrated as merely entering the drill and no further circuitry is shown. The ground lead 16 is shown in phantom as being wound through the toroid 50 a number of times and the free end of the line 22 being connected to a conventional screw terminal 52 on the case 18. A trigger 54 is shown operatively connected to a representative control circuit 46 which is shown without connecting circuitry. It can be seen that the size of the toroid 50 forming the inductor $L_C$ (20) easily fits within the confines of the handle of the drill, which is normally hollow. It should be appreciated that the position of the toroid 50 shown in FIG. 3 is representative only and that the inductor $L_C$ (20) may be located anywhere within the case 18 of the drill depending upon its physical configuration.

It has been found that for a large variety of particular types of equipment, such as the illustrated electric drill, a single set of capacitor and inductor component values can be used so that the electromagnetic interference suppression can be economically accomplished. For the illustrated electric drill, the presently preferred embodiment of the invention includes a 0.1 mfd capacitor and an inductor $L_C$ (20) formed by between 5 and 15 turns of the ground lead 16 through a toroid having a relative permeability of approximately 1,000 to 5,000. The exact number of turns is normally not critical and depends upon the size of the ground lead 16 and the size of the toroid 50. It should be appreciated that the number of turns should remain relatively low due to the fact that increasing the number of turns also increases the parasitic capacitance of the inductor $L_C$ (20) which permits passing of the common mode interference through that parasitic capacitance and also increases costs. Other types of equipment may require different combinations of capacitance and inductance which should be empirically determined from the type of equipment and the suppression standard which must be met.

Figure 4:
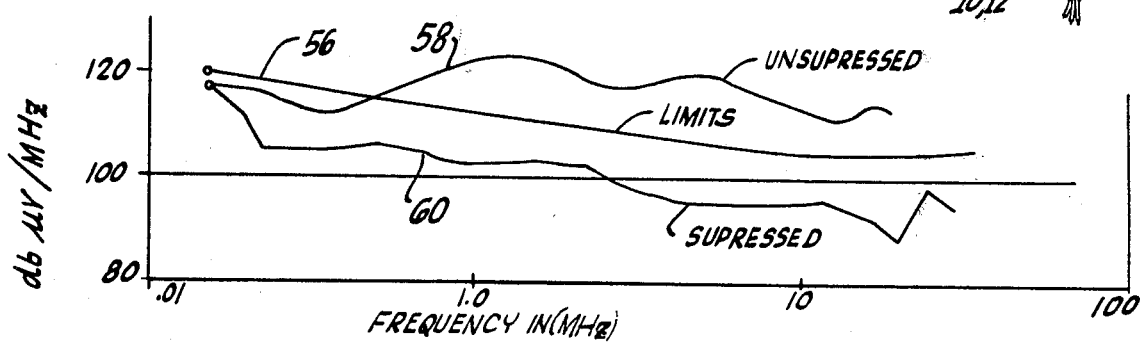
FIG. 4 is a graphical presentation of the suppression efficiency of the system of the invention.

With respect to a particular suppression standard for which the presently preferred embodiment of the invention was designed, FIG. 4 illustrates a graph of electromagnetic interference energy versus a logarithmic frequency scale. A particular emission standard is shown by the line 56 which approximates a particular standard. A line 58 represents the emissions from a typical electrical drill which is not suppressed and a line 60 represents that same electric drill with the suppression system of the present invention installed. It can be seen that the emission standard is easily met by the suppression system.

While a particular presently preferred embodiment of the invention has been described and illustrated in detail it should be appreciated that the electromagnetic interference suppression system of the present invention may be utilized in a wide variety of electrical equipment and that many variations and modifications of particular applications may be utilized by those having ordinary skill in the art. Therefore, the invention is not to be limited except by the following claims.

We claim:

1. An electromagnetic interference suppression system for use with electrical equipment having a surrounding case, said case receiving a power cable comprising two alternating current power lines connected for operably energizing said equipment and insulated electrically from said case, and a ground lead connected electrically to said case, said system consisting essentially of:

a capacitor shunting said power lines; and an inductor connected in series with said ground lead, said inductor formed by a toroidal core through which said ground lead is wound a relatively few number of turns, said capacitor and said inductor both positioned within said case.

2. The electromagnetic interference suppression system defined in claim 1 wherein:

said toroidal core comprises a magnetic material having a high relative permeability.

3. The electromagnetic interference suppression system defined in claim 2, wherein:

said toroidal core has a permeability of between 1,000 and 5000.

4. An electromagnetic interference suppression system for use with electric equipment having a motor and a surrounding case, said case receiving a power cable comprising two alternating current power lines connected for operably energizing said equipment and insulated electrically from said case, and a ground lead connected electrically to said case, said system consisting essentially of:

a capacitor shunting said power lines; and an inductor connected in series with said ground lead, said inductor comprising a toroid formed of a ferrite material through which said ground lead is wound between 5 and 15 turns;

said capacitor and said inductor both positioned within said case.

5. The electromagnetic interference suppression system defined in claim 4 wherein:

said toroid has a high relative permeability.

6. The electromagnetic interference suppression system defined in claim 5 wherein:

said toroid has a relative permeability of between 1,000 and 5,000.

* * * * *